(12) United States Patent
Jeong et al.

(10) Patent No.: US 9,458,931 B2
(45) Date of Patent: Oct. 4, 2016

(54) SHIFT LEVER APPARATUS FOR VEHICLE

(71) Applicant: Hyundai Motor Company, Seoul (KR)

(72) Inventors: Won Jin Jeong, Hwaseong-si (KR); Deok Ki Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 14/465,592

(22) Filed: Aug. 21, 2014

(65) Prior Publication Data
US 2015/0167828 A1  Jun. 18, 2015

(30) Foreign Application Priority Data
Dec. 18, 2013  (KR) .................. 10-2013-0157915

(51) Int. Cl.
*F16H 59/02* (2006.01)
*F16H 59/10* (2006.01)
*F16H 61/36* (2006.01)

(52) U.S. Cl.
CPC ............ *F16H 61/36* (2013.01); *F16H 59/105* (2013.01); *F16H 59/0204* (2013.01); *F16H 59/10* (2013.01); *Y10T 74/2014* (2015.01)

(58) Field of Classification Search
None
See application file for complete search history.

(56) References Cited

U.S. PATENT DOCUMENTS

| 4,189,952 A * | 2/1980 | Zajichek | F16H 61/36 74/473.15 |
|---|---|---|---|
| 2005/0139031 A1* | 6/2005 | Giefer | F16H 59/0204 74/473.15 |
| 2005/0239596 A1* | 10/2005 | Giefer | F16H 59/105 477/96 |
| 2013/0220051 A1* | 8/2013 | Geberth | F16H 59/04 74/473.3 |

FOREIGN PATENT DOCUMENTS

| JP | 2006-505441 A | 2/2006 |
| JP | 2007-302247 A | 11/2007 |
| JP | 2010-264950 A | 11/2010 |
| KR | 1998-060463 A | 10/1998 |
| KR | 2001-0061163 A | 7/2001 |
| KR | 10-2005-0067792 A | 7/2005 |
| KR | 10-2013-0059129 A | 6/2013 |

* cited by examiner

*Primary Examiner* — William Kelleher
*Assistant Examiner* — Randell J Krug
(74) *Attorney, Agent, or Firm* — Morgan, Lewis & Bockius LLP

(57) ABSTRACT

A shift lever apparatus for a vehicle may include a shift lever that may be pivotable in a front-rear direction for selecting P-, R-, N-, and D-ranges and in a left-right direction for selecting an M-range, a lever bracket to which the shift lever may be pivotably coupled at a predetermined position of the lever bracket, a sliding block slidably coupled to the lever bracket and slidable straight on the lever bracket, wherein the sliding block includes a cable connection portion integrally formed thereto to be connected with a cable, and a displacement conversion mechanism that converts a front-rear pivot displacement of the shift lever into a straight sliding displacement of the sliding block.

4 Claims, 4 Drawing Sheets

SHIFT LEVER APPARATUS FOR VEHICLE

CROSS-REFERENCE(S) TO RELATED APPLICATION

The present application claims priority of Korean Patent Application Number 10-2013-0157915 filed on Dec. 18, 2013, the entire contents of which application is incorporated herein for all purposes by this reference.

BACKGROUND

1. Field of the Invention

The present invention relates to a shift lever apparatus for a vehicle, and more particularly, to a structure of a shift lever apparatus used for automatic transmission vehicles with a manual mode.

2. Description of Related Art

In the automatic transmission vehicles, P-, R-, N-, and D-ranges are usually arranged straight, one of the shift ranges can be selected by pivoting a shift lever, and as the shift lever pivots, a cable 500 is pulled, as shown in FIG. 1, so that the operation force is transmitted to a transmission.

Referring to FIG. 1, since the point where the cable 500 is connected to the shift lever 502 is a portion separated above from the pivot point C of the shift lever 502, as the shift lever 502 pivots, the portion where the cable 500 is connected to the shift lever 502 moves up/down in accordance with the pivot angle and the up-down movement of the portion where the cable 500 is connected causes the efficiency of transmitting the operation force to a transmission to decrease.

The shift lever apparatus has an M-range for a manual mode following the D-shift other than the P-, R-, N-, and D-ranges such that the manual mode can be selected by moving the shift lever 502 perpendicular to the straight line made by the P-, R-, N-, and D-ranges. Further, in the manual mode, the operation of the shift lever 502 in the forward (+)/backward (−) operation is detected only by a sensor and transmitted to a transmission without using the specific cable 500.

FIG. 2 is a view comparing the operation structure of the shift lever device of the related art which can select the manual mode, in which the left one shows the D-range and the right one shows the M-range. In the left one with the shift lever 502 pivoted in the left-right direction toward an engaging lever 504, a connection protrusion 508 of the shift lever 502 is inserted in the engaging lever 504, so the P-, R-, N-, and D-ranges can be selected by pivoting the shift lever 502 in the front-rear direction and the operation force is transmitted to a transmission through a cable connected to a cable connection portion 506 on the engaging lever 504.

In the right one showing the M-range with the shift lever 502 pivoted away from the engaging lever 504 and the connection protrusions 508 of the shift lever 502 completely separated from the engaging lever 504, when the shift lever 502 is pivoted in the front-rear direction, an electric signal for selecting the forward (+) or the backward (−) of the manual mode is generated through a sensor and the manual mode is activated.

However, as described above, in the structure with the engaging lever 504 and the shift lever 502 on the same shaft S as individual pivot bodies, the width W needs to be relatively large due to the thickness of the engaging lever 504, the thickness of the shift lever 502, and the arrangement relationship therebetween for achieving the operation and the large width of the shift lever 502 and the engaging lever 504 reduces mounting convenience because shift lever apparatuses for common use need to be easily mounted on various vehicles.

That is, the smaller the width and volume of the mechanism made by the shift lever 502 and the engaging lever 504, the easier the mechanism to be mounted on various types of vehicles, which is advantageous in terms of convenience of mount, but the structure is a little difficult to be mounted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift lever apparatus for a vehicle which can maximize the operation efficiency of transmitting operation force from a driver by preventing shaking of a cable connection portion when a shift lever pivots, and can be easily mounted on various types of vehicles with only a mounting bracket changed, by making it possible to relatively more decrease the width of the shift lever apparatus.

In an aspect of the present invention, a shift lever apparatus for a vehicle, may include a shift lever that is pivotable in a front-rear direction for selecting P-, R-, N-, and D-ranges and in a left-right direction for selecting an M-range, a lever bracket to which the shift lever is pivotably coupled at a predetermined position of the lever bracket, a sliding block slidably coupled to the lever bracket and slidable straight on the lever bracket, wherein the sliding block may include a cable connection portion integrally formed thereto to be connected with a cable, and a displacement conversion mechanism that converts a front-rear pivot displacement of the shift lever into a straight sliding displacement of the sliding block.

The shift lever apparatus may further may include rail protrusions formed in the lever bracket and disposed at both sides of the sliding block to guide the sliding block to slide straight, and rail grooves formed on the sliding block, wherein each of the rail protrusions of the lever bracket is slidably inserted in a corresponding rail groove of the rail grooves.

A straight sliding direction of the sliding block is in parallel with a longitudinal direction of the cable connected to the sliding block.

The displacement conversion mechanism may include an oblong slot formed in the sliding block, and a lever pin protruding from the shift lever to be selectively inserted in the oblong slot.

The oblong slot is elongated perpendicular to a straight sliding direction of the sliding block.

The lever pin is inserted in the oblong slot, when the shift lever is at the D-range, and the lever pin is separated from the oblong slot, when the shift lever is at the M-range.

According to the present invention, it is possible to maximize the operation efficiency of transmitting operation force from a driver by preventing shaking of a cable connection portion when a shift lever pivots, and to improve mounting convenience for easily mounting a shift lever apparatus on various types of vehicle with only a mounting bracket changed, by making it possible to comparatively more decrease the width of the shift lever apparatus.

The methods and apparatuses of the present invention have other features and advantages which will be apparent

Figure 1:
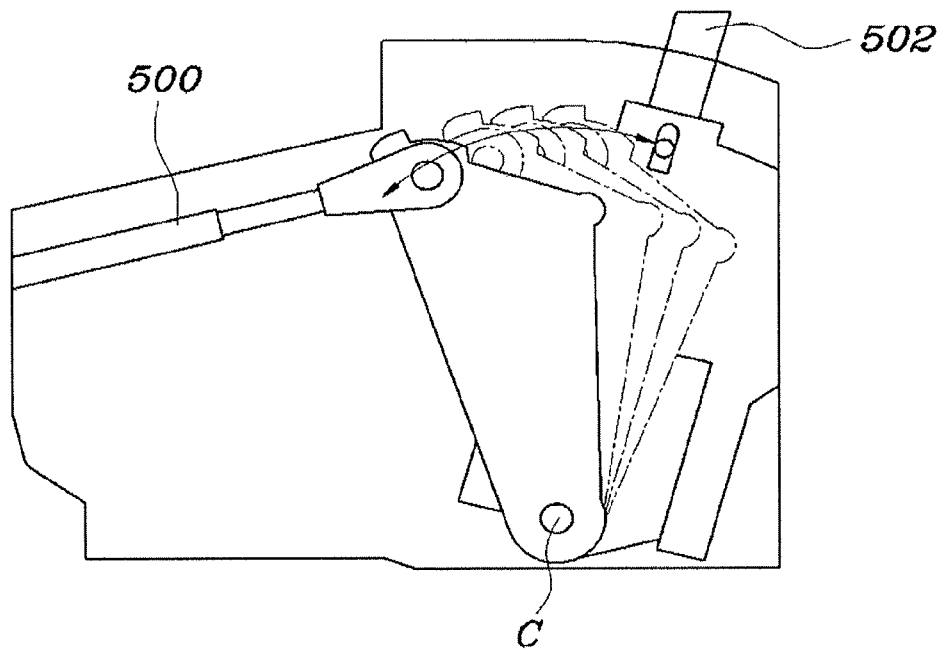
FIGS. 1 and 2 are views illustrating the operation of a shift lever apparatus of the related art.
Figure 2:
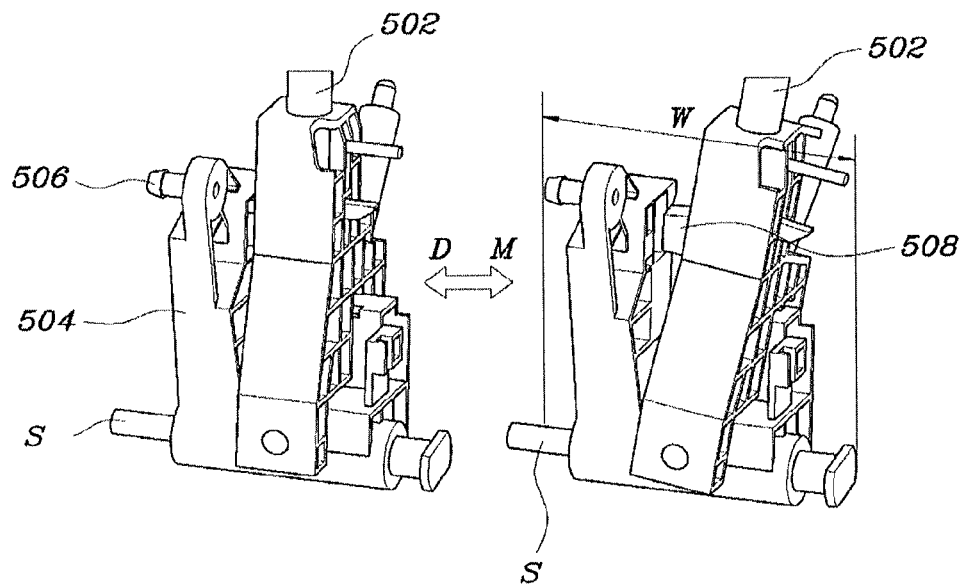
Figure 3:
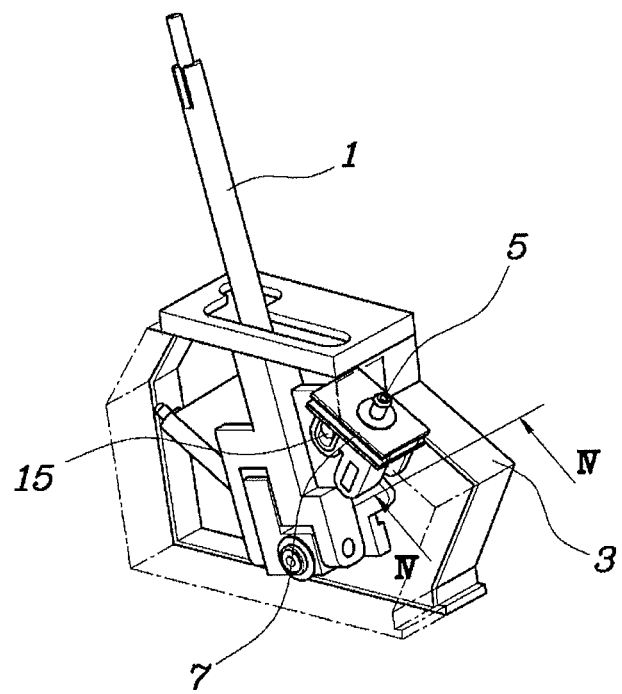
FIG. 3 is a perspective view showing a shift lever apparatus for a vehicle according to an exemplary embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Referring to FIGS. 3 to 7, an exemplary embodiment of a shift lever apparatus for a vehicle of the present invention includes: a shift lever 1 that can pivot in a front-rear direction for selecting P-, R-, N-, and D-ranges and in a left-right direction for selecting an M-range, a lever bracket 3 that is disposed at a predetermined position with respect to a pivot point of the shift lever 1, a sliding block 7 that can slide straight on the lever bracket 3 and has a cable connection portion 5 integrally formed to be connected with a cable, and a displacement conversion mechanism that converts a front-rear pivot displacement of the shift lever 1 into a straight sliding displacement of the sliding block 7.

That is, according to an exemplary embodiment of the present invention, the sliding block 7 that slides straight is provided instead of an engaging lever of the related art and the sliding block 7 provides only the displacement in a longitudinal direction of the cable by changing the pivot displacement of the shift lever 1 to the straight displacement of the sliding block 7, so that shaking of the cable connection portion 5 is prevented and the operation efficiency is improved. Further, since the sliding block 7 does not need to be disposed on the same shaft with the shift lever 1, but has only to be slidable on the lever bracket 3, the width or the volume occupied by the sliding block 7 and the shift lever 1 is smaller than that of the related art in a compact configuration, so that mounting convenience for easily mounting the apparatus on various types of vehicles by changing only a mounting part such as a mounting bracket is improved.

The lever bracket 3 may be substantially an individual bracket or may be implemented in the form of a housing covering the shift lever 1. However, the condition of the lever bracket 3 which is finally necessary for the configuration of the present invention is that it can guide the sliding block 7 sliding straight while providing a predetermined position with respect to the pivot motion of the shift lever 1.

Figure 4:
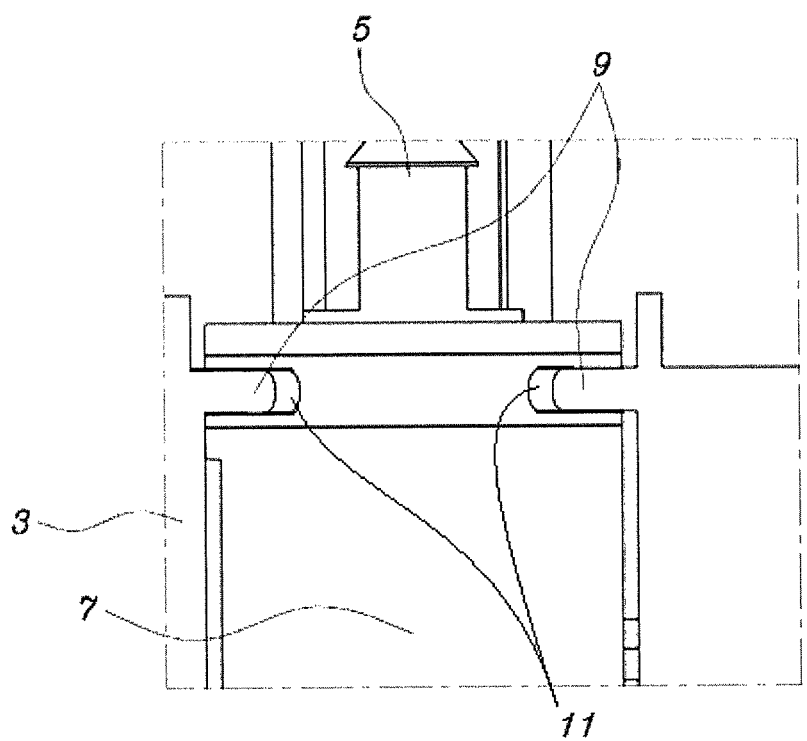
FIG. 4 is a cross-sectional view taken along line IV-IV of FIG. 3.
Figure 5:
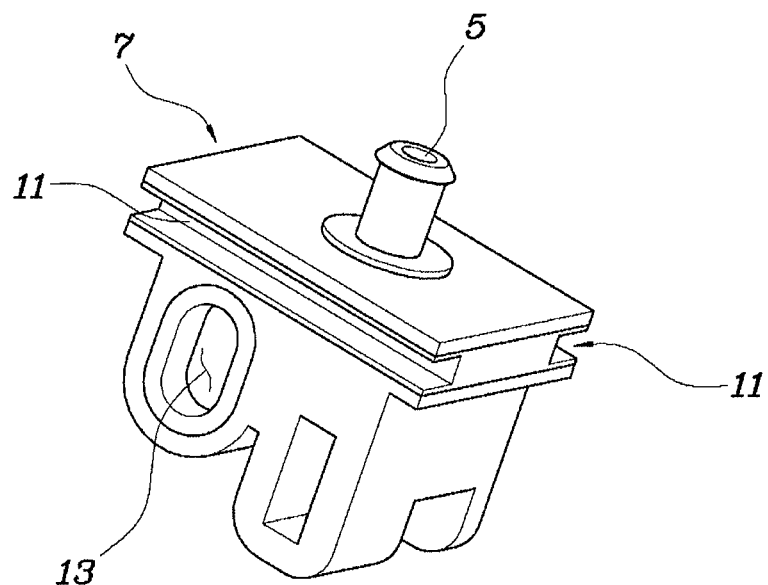
FIG. 5 is a perspective view showing only a sliding block of FIG. 3.
Figure 6:
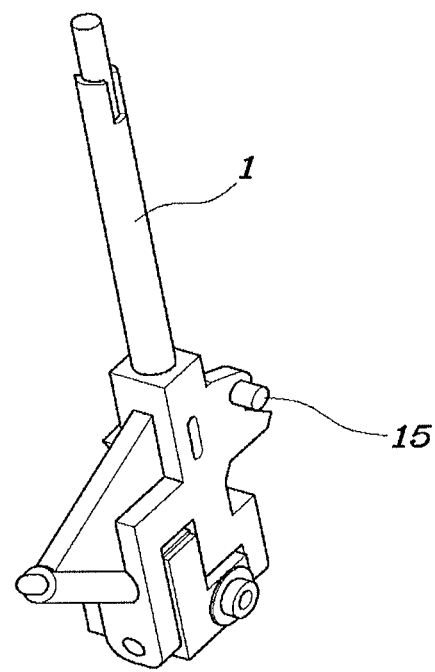
FIG. 6 is a perspective view showing a shift lever of FIG. 3.

As shown in detail in FIG. 4, rail protrusions 9 that guide the sliding block 7 sliding straight are disposed at both sides of the sliding block 7, in the lever bracket 3 and rail grooves 11 in which the rail protrusions 9 of the lever bracket 3 are inserted are formed on the sliding block 7, so that the sliding block 7 can stably slide straight with respect to the lever bracket 3.

Obviously, the sliding direction of the sliding block 7 is in parallel with the length direction of the cable connected to the sliding block 7 to correspond to the object of the present invention, that is, to prevent shaking of the cable connection portion 5.

In the exemplary embodiment, the displacement conversion mechanism includes an oblong slot 13 formed in the sliding block 7 and a lever pin 15 protruding from the shift lever 1 to be inserted in the oblong slot 13.

That is, with the lever pin 15 in the oblong slot 13, a change in path of movement of the lever pin 15 by pivot of the shift lever 1 is converted into a straight motion while being absorbed by the oblong slot 13, and the straight motion is provided to the sliding block 7.

Accordingly, the oblong slot 13 is elongated perpendicular to the sliding direction of the sliding block 7. Obviously, the lever pin 15 is inserted into the oblong slot 13, when the shift lever 1 is at the D-range, and it is separated from the oblong slot 13, when the shift lever 1 is at the M-range.

Figure 7:
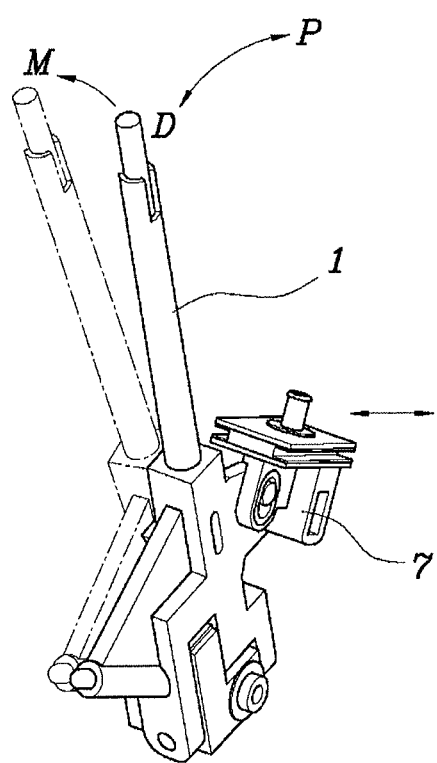
FIG. 7 is a view illustrating the operation of the shift lever and the sliding block of the present invention.

FIG. 7 is a view illustrating the operation of main components of the shift lever apparatus for a vehicle of the present invention, in which as the shift lever 1 pivots in the front-rear direction between the D-range and the P-range, the sliding block 7 provides a straight displacement to the cable while sliding straight by the lever pin 15 and operation force is transmitted to a transmission. Further, as the shift lever 1 pivots in the left-right direction, the M-range for the manual mode and the D-range can be switched, in which the lever pin 15 is inserted into the oblong slot 13 after being separated from it, and accordingly, the front-rear directional pivot force of the shift lever 1 can be transmitted to the sliding block 7.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever apparatus for a vehicle, comprising:
   a shift lever that is pivotable in a front-rear direction for selecting P-, R-, N-, and D-ranges and in a left-right direction for selecting an M-range;
   a lever bracket to which the shift lever is pivotably coupled at a predetermined position of the lever bracket;
   a sliding block slidably coupled to the lever bracket and slidable straight on the lever bracket, wherein the sliding block includes a cable connection portion integrally formed thereto to be connected with a cable; and a displacement conversion mechanism that converts a front-rear pivot displacement of the shift lever into a straight sliding displacement of the sliding block, wherein the displacement conversion mechanism includes:
 an oblong slot formed in the sliding block; and
 a lever pin protruding from the shift lever to be selectively inserted in the oblong slot, wherein the oblong slot is elongated perpendicular to a straight sliding direction of the sliding block.

2. The shift lever apparatus of claim 1, further including:
rail protrusions formed in the lever bracket and disposed at both sides of the sliding block to guide the sliding block to slide straight; and
rail grooves formed on the sliding block, wherein each of the rail protrusions of the lever bracket is slidably inserted in a corresponding rail groove of the rail grooves.

3. The shift lever apparatus of claim 1, wherein a straight sliding direction of the sliding block is in parallel with a longitudinal direction of the cable connected to the sliding block.

4. The shift lever apparatus of claim 1, wherein the lever pin is inserted in the oblong slot, when the shift lever is at the D-range, and the lever pin is separated from the oblong slot, when the shift lever is at the M-range.

* * * * *